United States Patent [19]

Auman et al.

[11] Patent Number: 5,670,609

[45] Date of Patent: *Sep. 23, 1997

[54] POLYIMIDE FILMS FROM PYROMELLITIC DIANHYDRIDE AND 2-2'-BIS (PERFLUOROALKOXY)BENZIDINES AS ALIGNMENT LAYERS FOR LIQUID CRYSTAL DISPLAYS

[75] Inventors: Brian Carl Auman, Newark, Del.; Edgar Bohm, Griesheim, Germany

[73] Assignee: E. I. Du Pont de Nemours and Company, Wilmington, Del.

[*] Notice: The term of this patent shall not extend beyond the expiration date of Pat. No. 5,286,841.

[21] Appl. No.: 512,607

[22] Filed: Aug. 8, 1995

[51] Int. Cl.[6] ............................ C08G 69/26; C08G 73/10
[52] U.S. Cl. ........................ 528/353; 528/125; 528/128; 528/170; 528/172; 528/173; 528/176; 528/183; 528/188; 528/220; 528/229; 528/350; 428/1; 428/473.5; 359/36
[58] Field of Search ...................... 528/353, 125, 528/128, 170, 172, 173, 174, 176, 183, 188, 220, 229, 350; 428/473.5; 359/36

[56] References Cited

U.S. PATENT DOCUMENTS

| | | | |
|---|---|---|---|
| 5,071,997 | 12/1991 | Harris | 528/353 |
| 5,286,841 | 2/1994 | Auman et al. | 528/353 |
| 5,344,916 | 9/1994 | Harris et al. | 528/353 |

FOREIGN PATENT DOCUMENTS

| | | | |
|---|---|---|---|
| WO-A-93 04033 | 3/1993 | WIPO | |

OTHER PUBLICATIONS

Patent Abstracts of Japan, vol. 17, No. 166 (P–1514), 30 Mar. 1993 & JP-A-04 328524 (Nippon Telegraph & Telephone Corp).

*Primary Examiner*—James J. Seidleck
*Assistant Examiner*—P. Hampton-Hightower

[57] ABSTRACT

A polyimide alignment film based on pyromellitic dianhydride and a 2,2'-bis(perfluoroalkoxy)benzidine, as major components, for use in liquid crystal display devices.

10 Claims, No Drawings

POLYIMIDE FILMS FROM PYROMELLITIC DIANHYDRIDE AND 2-2'-BIS (PERFLUOROALKOXY)BENZIDINES AS ALIGNMENT LAYERS FOR LIQUID CRYSTAL DISPLAYS

BACKGROUND OF THE INVENTION

1. Field of the Invention

The present invention relates to a polyimide alignment film based on pyromellitic dianhydride and a 2,2'-bis (perfluoroalkoxy)benzidine, as major components, and to a liquid crystal display device using such an alignment film.

2. Description of the Prior Art

Liquid crystal display (LCD) devices have become increasingly important in displays which require very low consumption of electrical power or where the environment dictates a lightweight, planar, flat surface. Thus, LCD's are used in display devices such as wristwatches, pocket and personal computers, aircraft cockpit displays, etc.

In its simplest form, a liquid crystal display device consists of a liquid crystal layer with opposite sides, a set of electrodes on either side of the liquid crystal layer and an alignment polymer layer between each set of electrodes and the liquid crystal layer. Alignment of the liquid crystal molecules occurs at a certain angle, referred to as the tilt angle, with respect to the plane of the inside of two substrates, e.g. glass plates, plastic sheets, quartz plates or others, which support the electrodes. The inside of the substrates have coatings of sets of transparent electrodes (electrical conductors), usually indium-tin oxide (ITO). The sets of electrodes are patterned, e.g. by etching, compatible with the information to be displayed by the LCD. The alignment process is most easily carried out by solution casting (spin coating, roller coating, dipping, spraying, printing and/or doctor blading) an organic polymer onto the two ITO coated substrates. After removal of the solvents and/or curing of the polymer layers, the substrates are usually rubbed or buffed in one direction with cloths. The rubbing process serves to establish a unique optical direction. After rubbing both substrates, they are rotated from 70 to 360 degrees with respect to each other; adhered together using organic adhesives to preserve a constant thickness to a space or gap between the substrates; filled with various mixtures of liquid crystal materials; and finally sealed using organic adhesives. At this stage, polarizing films are often attached to the outside surfaces of the substrates by a lamination process. Finally, electrical connections are made to both substrates in a manner consistent with the electrical and display designs.

The use of rubbed polymer films, i.e. alignment direction and tilt angle controlling films, dominates the process technology used in the production of all categories of liquid crystal displays, and polyimides are the most common alignment films in use today. Moreover, the tilt angle and its magnitude are very important in the various electro-optic responses and the electro-optic properties of the LCD device. The stability, legibility and reliability of the LCD are all related to the magnitude and stability of the tilt angle. The tilt angle has to be stable to high temperature and illumination, and the magnitude of the tilt angle has to be stable for long storage times in order to provide a long operational time for the displays. This holds particularly for the value of the tilt angle obtained after the heat treatment of the display after sealing the cells filled with liquid crystals.

Polyimide films used to control the alignment direction and the tilt angle of liquid crystal molecules in liquid crystal displays are very thin, generally being on the order of from 100 to 2000 angstroms. The tilt is induced in a unique direction of the polyimide polymer by gentle buffing with specific cloths. The actual tilt angle obtained is a function of polymer ordering on the surface, the resulting surface energy, the nature of the cloth used to buff the surface and the amount of buffing work. In addition to these variables, each of the hundreds of commercial liquid crystal formulations interacts differently with a given surface. In general, however, the single most important factor determining the value range of the tilt angle is the intrinsic character of the polyimide used to control this angle.

Twisted nematic (TN) LCD's, such as those used in pocket TV sets and watches, generally require lower tilt angles in the range of from 2 to 3 degrees. Recently, for more widely used sophisticated super twisted nematic (STN) LCD's, polyimide alignment films providing higher tilt angles typically greater than 4 degrees, preferably greater than 6 degrees, are required. In addition, such STN polyimide alignment films must provide stable and predictable alignment of the STN liquid crystal molecules after time, temperature and solvent exposure and give very low or no image sticking.

Therefore, a need exists for a polyimide alignment film which provides high tilt angles together with other desirable STN liquid crystal display characteristics.

U.S. Pat. No. 5,286,841, issued on Feb. 15, 1994, discloses polyimides, useful as films, fibers or shaped articles, derived from aromatic tetracarboxylic dianhydrides and fluorinated aromatic diamines of the formula

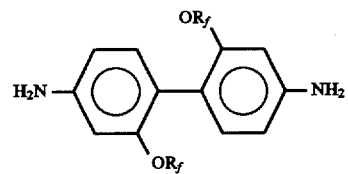

wherein $R_f$ is a linear or branched perfluorinated alkyl group containing from 1 to 18 carbon atoms.

U.S. Pat. No. 5,071,997, issued on Dec. 10, 1991, discloses polyimides and copolyimides derived from aromatic tetracarboxylic dianhydrides and substituted benzidines of the formula

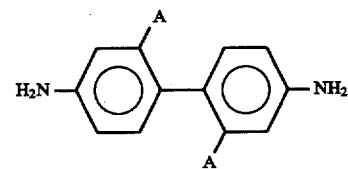

wherein A is a fluorinated alkyl group, an aryl group or a substituted aryl group. The polyimides are suitable for use as coating materials for microelectronic devices, as membranes for molecular or gas separation, as fibers in molecular composites, as high tensile strength and high compression strength fibers, as film castable coatings and as fabric components.

U.S. Pat. No. 5,344,916, issued on Sep. 6, 1994, discloses negative birefringent soluble polyimide and copolyimide films, for use as a compensator layer in a liquid crystal display, derived from aromatic tetracarboxylic dianhydrides and 2,2'-bis(trifluoromethyl)-4,4'-diaminobiphenyl.

None of the prior art U.S. patents, however, discloses a polyimide alignment film containing 2,2'-bis (perfluoroalkoxy)benzidine as a major diamine component and which provides high tilt angles and also gives good and stable alignment of STN liquid crystal molecules with little or no image sticking.

SUMMARY OF THE INVENTION

The present invention provides a polyimide alignment film for aligning a liquid crystal layer of a liquid crystal display device comprising an aromatic tetracarboxylic acid component containing from 60 to 100 mole %, based on the total molar amount of aromatic tetracarboxylic acid component, of pyromellitic acid or a functional derivative thereof and an aromatic diamine component containing from 40 to 100 mole %, based on the total molar amount of aromatic diamine component, of a fluorinated aromatic diamine of formula (I)

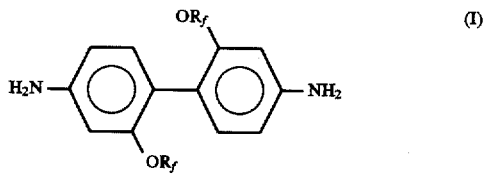

wherein $R_f$ is a linear or branched perfluorinated alkyl group containing from 1 to 4 carbon atoms and wherein said polyimide alignment film provides said liquid crystal layer with a tilt angle of from 3 to 25 degrees.

The present invention further provides a liquid crystal display device comprising:

(a) a liquid crystal layer having opposite sides;

(b) a set of electrodes on either side of said liquid crystal layer; and (c) a polyimide alignment film layer, between each set of electrodes and said liquid crystal layer, comprising an aromatic tetracarboxylic acid component containing from 60 to 100 mole %, based on the total molar amount of aromatic tetracarboxylic acid component, of pyromellitic acid or a functional derivative thereof and an aromatic diamine component containing from 40 to 100 mole %, based on the total molar amount of aromatic diamine component, of a fluorinated aromatic diamine of formula(I)

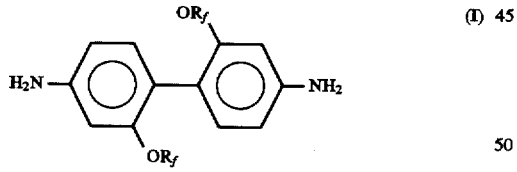

wherein Rf is a linear or branched perfluorinated alkyl group containing from 1 to 4 carbon atoms and wherein said polyimide alignment film provides said liquid crystal layer with a tilt angle of from 3 to 25 degrees, preferably from 5 to 15 degrees and, most preferably from 7 to 13 degrees.

DETAILED DESCRIPTION OF THE INVENTION

The polyimide used as an alignment film in the liquid crystal display device of the present invention is a polycondensation-imidization reaction product of an aromatic tetracarboxylic acid component with an aromatic diamine component.

The aromatic tetracarboxylic acid component comprises, as a main acid ingredient, from 60 to 100 mole %, preferably from 75 to 100 mole %, of pyromellitic acid or its functional derivative, such as an acid anhydride, an ester or a mixture thereof. The aromatic tetracarboxylic acid component may contain, in addition to the main acid ingredient, an additional acid ingredient, comprising not more than 40 mole %, preferably from 0 to 25 mole %, of other tetracarboxylic acids and their functional derivatives.

The tetracarboxylic acids and their functional derivatives which can be used in combination with the pyromellitic acid or its functional derivative include, but are not limited to, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2-bis(3,4- dicarboxylphenyl)-hexafluoropropane, 2,2-bis(3,4 dicarboxyphenyl)propane, 1,4,5,8-naphthalene-tetracarboxylic acid, 2,3,6,7-naphthalenetetracarboxylic acid, 1,2,5,6-naphthalene-tetracarboxylic acid, bis(3,4-dicarboxyphenyl)sulfone, 1,1-bis(2,3-dicarboxy-phenyl)ethane, 1,1-bis(3,4-dicarboxyphenyl)ethane, bis(2,3-dicarboxyphenyl)methane, bis(3,4-dicarboxy-phenyl)methane, bis(3,4-dicarboxy-phenyl)ether, 1,4-bis (3,4-dicarboxyphenoxy)benzene, 1,3-bis(3,4-dicarboxybenzoyl)benzene, 9,9-bis (trifluoromethyl)- 2,3,6,7-xanthenetetracarboxylic acid, 9-phenyl-9-trifluoromethyl-2,3,6,7-xanthenetetracarboxylic acid,(trifluoromethyl)-2,3,5-tricarboxycyclopentyl acetic acid, cyclobutanetetracarboxylic acid and their functional derivatives, such as acid anhydrides and esters. These tetracarboxylic acids and their functional derivatives may be used alone or in combination. Of these tetracarboxylic acids and their functional derivatives, tetracarboxylic dianhydrides are particularly preferred.

When the tetracarboxylic acid component to be polymerized with the aromatic diamine component contains less than 60 mole % of pyromellitic acid or its functional derivative, the tilt angle provided by the resultant polyimide tends to be too low for use in high tilt STN liquid crystal displays. The stability of the tilt angle may also be adversely afected.

The aromatic diamine component comprises, as a main diamine ingredient, from 40 to 100 mole %, preferably from 75 to 100 mole %, of a fluorinated aromatic diamine of formula (I)

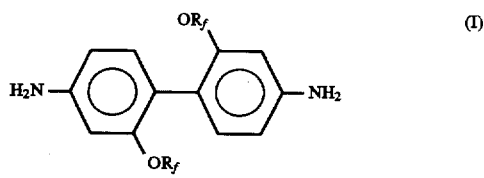

wherein Rf is a linear or branched perfluorinated alkyl group containing from 1 to 4 carbon atoms. The fluorinated aromatic diamines may be prepared by known processes, for example, as described in U.S. Pat. No. 5,286,841. A particularly preferred fluorinated aromatic diamine for use in the invention is 2,2'-bis(trifluoromethoxy)-benzidine.

The aromatic diamine component may contain, in addition to the main fluorinated aromatic diamine (I) ingredient, an additional aromatic diamine ingredient, comprising not more than 60 mole %, preferably from 0 to 25 mole % of other aromatic diamines. When the proportion of fluorinated aromatic diamine (I) ingredient to the total aromatic diamine component is less than 40 mole %, the tilt angle provided by the resultant polyimide tends to be substantially lowered. In addition, the stability of the tilt angle and the quality of alignment may be adversely affected.

The aromatic diamines which can be used in combination with the fluorinated aromatic diamine (I) include, but are not limited to, 4,4'-diaminodiphenyl ether, 4,4'-diamino-3,3'-dimethylbiphenyl, 4,4'-diamino-3,3'-dimethoxybiphenyl, 4,4'-bis(4-aminophenoxy) biphenyl, 4,4'-diaminodiphenylsulfone, 3,3'-diaminodiphenylsulfone, bis [4-(4-aminophenoxy)-phenyl]sulfone, bis[4-(3-aminophenoxy)phenyl]sulfone, bis[4-(2-aminophenoxy) phenyl]sulfone, 1,4-bis(4-aminophenoxy) benzene, 4,4'-diamino-2,2'-dichloro-5,5'-dimethoxybiphenyl, 4,4'-diamino-2,2',5,5'-tetrachlorobiphenyl, 1,3-bis(4-aminophenoxy)benzene, 1,3-(bis(3-aminophenoxy) benzene, 1,4-bis(4-amino-phenyl)benzene, [4-(4-aminophenoxy)phenyl]ether, bis(4-aminophenyl) methane, bis(4-amino-3-ethylphenyl)methane, bis(4-amino-3-methylphenyl)methane, bis(4-amino-3-chlorophenyl) methane, bis(3-aminophenyl)ether, 3,4'-diaminodiphenyl ether, 2,2-bis[4-(4-aminophenoxy)-phenyl]propane, 2,2-bis [4-(4-aminophenoxy)phenyl]-hexafluoropropane, 2,2-bis(4-aminophenyl)propane, 2,2-bis(4-aminophenyl) hexafluoropropane, 2,2-bis(3-aminophenyl) hexafluoropropane, 2,2-bis(4-amino-3-hydroxyphenyl) propane, 2,2-bis(4-amino-3-hydroxyphenyl) hexafluoropropane, 4,4'-diamino-3,3'-dichlorobiphenyl, 4,4'-diamino-3,3'-dihydroxybiphenyl, 4,4'-diaminobiphenyl, bis(3-amino-4-methylphenyl)-sulfone, bis(4-amino-2,6-dimethylphenyl)methane, 2,4-diamino-1-isopropylbenzene, 1,4-diamino-2,5-dichloro-benzene, 1,4-diamino-2,6-dichlorobenzene, 1,4-diamino-2,5-dimethylbenzene, 1,4-diamino-2-chlorobenzene, 1,3-diamino-4-chlorobenzene, 1,4-diamino-5-chloro-2-methylbenzene, 1,4-diamino-2,3,5, 6-tetramethylbenzene, 1,3-diamino-2,4,6-trimethylbenzene, p-phenylene diamine, m-phenylene diamine, 1,2-bis(4-aminophenyl)ethane, 2,4-diaminotoluene, 2,2'-bis(trifluoromethyl)-4,4'-diaminodiphenyl ether, 5-trifluoromethyl-1,3-phenylene diamine, 5-perfluorooctyl-1,3-phenylene diamine, 5-perfluorooctyl-1,3-diaminomesitylene, 1,4-diaminocyclohexane, bis-(4-aminocyclohexyl)methane and 2,2'-bis(trifluoromethyl) benzidine.

The polyimide alignment film of the present invention may be prepared by solution polymerization of substantially equimolar amounts of the aromatic tetracarboxylic acid component and the aromatic diamine component at ambient room temperature to 50° C. in N-methylpyrrolidone or N, N-dimethylacetamide solvent.

The resulting poly(amic acid) solution is subsequently diluted and coated by spin coating onto indium-tin oxide (ITO) coated glass plates and then cured at a temperature of from 150° to 350° C. for from 1 minute to 2 hours, preferably from 180° to 250° C. for from 30 minutes to 2 hours, to effect dehydration and ring closure of the poly (amic acid) to form a polyimide coating. The polyimide coating is further subjected to a rubbing treatment, which is well-known in the art, to provide an alignment controlling film of the invention. The thickness of the alignment film typically ranges from 100 to 1000 angstroms and can be adjusted by varying the amount of polymer applied or the coating method used.

A review of conventional alignment controlling techniques is given, for example, by I. Sage in Thermotropic Liquid Crystals, edited by G. W. Gray, John Wiley & Sons, 1987, pages 75 to 77 and by J. M. Geary et al, in Journal of Applied Physics, Vol. 62(10), 1987, pages 4100–4108.

A pair of the glass substrates covered with the electrodes and coated with the alignment controlling film are placed in opposition to each other, so that the respective alignment films face each other, and then are bonded to each other to form a predetermined space by interposing spacers between them or by some other means. An STN liquid crystal composition, for example, ZLI-2293, (sold by E. Merck, Germany) is filled into said space and then the filling hole is sealed with an adhesive.

Light polarizer layers are deposited on both outside glass surfaces. The directions of polarization of the two polarizers are adjusted with respect to each other, depending on the specific cell configuration. The polarizer orientations are described, for example, in European Patent 01 31 216 and European Patent 02 60 450, while other orientations can also be used. In compensated TN cells, the two directions are either substantially perpendicular (normally white cells) or substantially parallel (normally black cells) to each other. The liquid crystals assume a spiral orientation through the thickness of the layer following the alignment of the liquid crystals by the two alignment layers which have directions from substantially 70° to 360° to each other. Twist angles, from 70° to 110° are particularly preferred for TN displays. For STN displays, twist angles from 170° to 270° are preferred, and twist angles from 180° to 265° are particularly preferred. Twist angles higher than 90° can be realized by adding a suitable doping component to the liquid crystal mixture.

Particularly preferred liquid crystal alignment films of the present invention comprise polyimides derived from 100 mole % of pyromellitic dianhydride, from 50 to 90 mole % of 2,2'-bis(trifluoromethoxy)benzidine and from 10 to 50 mole % of 4,4'-diaminodiphenyl ether; and from 100 mole % of pyromellitic dianhydride, from 80 to 95 mole % of 2,2'-bis(trifluoromethoxy)benzidine and from 5 to 20 mole % of 2,2-bis-(4-aminophenyl)hexafluoropropane.

Liquid crystals that can be used in the present invention are either nematic or smectic liquid crystals. Nematic liquid crystals are preferred. These can have positive dielectric anisotropies as well as negative dielectric anisotropies.

For TN, STN and AMD-TN applications nematic liquid crystals with positive dielectric anisotropy are preferred. Dielectric negative liquid crystals are used for ECB displays and for some displays using an electric field essentially parallel to the substrates, e.g. by comb-shaped electrodes leading to in-plane switching of the liquid crystals. For these in-plane switching displays, as well as for amorphous TN and also for axially symmetric micro domain displays, dielectrically positive liquid crystals can be used.

Typically the liquid crystals are mixtures of from 3 to about 30 compounds. In some cases even up to 40 and more compounds can be used. Preferred are mixtures consisting of from 5 to 25 compounds, whereas especially preferred are mixtures of from 7 to 20 compounds. Most preferred, however, are mixtures containing from 8 to 16 compounds.

The liquid crystals used in the present invention have a clearing point of more than 60° C., preferably more than 70° C. and, most preferably, more than 80° C. For STN applications clearing points of at least 85° C. and of even more than 90° C. are preferred. The phase range is at least 80° C. wide, however, more than 90° C. is preferred. In many applications this range is more than 100° C. The lower storage temperature is at least −20° C., preferably −30° C., and most preferably −40° C.

Liquid crystal mixtures that can be used in the liquid crystal displays of the present invention include high holding ratio LC mixtures for active matrix addressed twisted nematic displays which are based on superfluorinated materials (SFM's).

Liquid crystals for STN displays which are especially preferred according to the present invention, preferably contain cyano phenylcyclohexanes. These mixtures preferably additionally or alternatively contain compounds with —CH=CH— groups in the alkyl side chains (i. e. alkenyl compounds) or with —CH=CH— bridging groups between the ring systems. Liquid crystals mixtures containing heterocyclic rings are further preferred.

The liquid crystal mixtures used in the LCD's according to the present invention preferably contain at least one compound of formula (II).

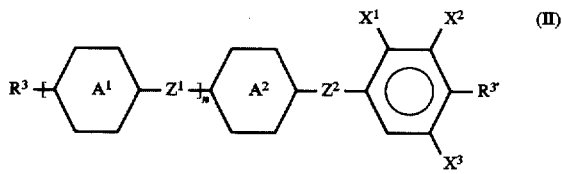

wherein $R^3$ is an alkyl group containing from 1 to 12 carbon atoms wherein, in addition, one or two non-adjacent —CH$_2$— groups can be replaced by —O—, —CO—, —COO—, —OCO— or —CH=CH—;

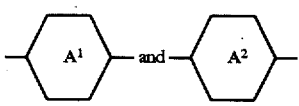

independently of one another, are trans-1,4-cyclohexylene, 1,4-phenylene, 2-fluoro-1,4-phenylene, 2,3-difluoro-1,4-phenylene, 2,3-difluoro-1,4-phenylene or 3,5-difluoro-1,4-phenylene, or one of

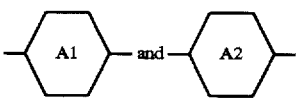

is alternatively pyrimidine-2,5-diyl, pyridine-2,5-diyl or trans-1,4-dioxane-2,5-diyl;

$Z_1$ and $Z_2$, independently of one another, are a direct bond, —CH$_2$CH$_2$—, —COO—, —OCO—, —CH=CH— or —C≡C—;

$X^1$, $X^2$ and $X^3$, independently of one another, are H or F; $R^{3'}$ is the same as $R^3$ or is Q-Y;

Q is —CF$_2$—, —OCF$_2$—, —C$_2$F$_4$— or a direct bond; Y is H, F, Cl or CN; and n is 0,1 or 2.

The proportion of one or more compounds of the formula (II) in the liquid crystal mixtures used according to the invention is preferably more than 15% by weight and, more particularly, more than 20% by weight. Liquid crystal mixtures containing more than 40% by weight and particularly more than 50% by weight of one or more compounds of the formula (II) are particularly preferred.

The liquid crystal mixtures used according to the invention can contain further components which are preferably selected from nematic or nematogenic (monotropic or isotropic) substances, in particular substances selected from the group consisting of azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoates, cyclohexylphenyl cyclohexanecarboxylate, cyclohexylphenyl cyclohexylcyclohexanecarboxylate, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis(cyclohexyl)benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electro-optical systems according to the invention may also contain one or more dielectrically neutral compounds having formulas (III) to (IV).

$$R_4\text{-L-E-}R^5 \qquad (III)$$

$$R_4\text{-L-CH}_2\text{CH}_2\text{-E-}R^4 \qquad (IV)$$

In the formulas (III) and (IV) above, L and E may be identical or different and are each, independently of one another, a divalent radical selected from the group consisting of -Phe-, -Cyc-, -Phe—Phe-, -Phe-Cyc-, -Cyc- Cyc-, -Pyr-, -Dio-, -G-Phe- and -G-Cyc- and mirror images thereof. Phe is unsubstituted or fluorine substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans(-1,4-cyclohexyl)ethyl, pyrimidine-2,5-diyl, pyridine-2,5-diyl or 1,3-dioxane-2,5-diyl. One of the radicals L and E is preferably Cyc, Phe or Pyr. E is preferably Cyc, Phe or Phe-Cyc.

The liquid cyrstals used in the invention preferably contain one or more components selected from compounds of formulas (III) and (IV), wherein L and E are selected from the group consisting of Cyc, Phe and Pyr and simultaneously one or more components are selected from the compounds of formulas (III) and (IV), wherein one of the radicals L and E is selected from the group comprising Cyc, Phe and Pyr and the other radical is selected from the group consisting of -Phe-Phe-, -Phe-Cyc-, -Cyc-Cyc-, -G-Phe- and -G-Cyco, and, if desired, one or more components are selected from the compounds of formulas (III) and (IV), wherein the radicals L and E are selected from the group consisting of -Phe-Cyc-, -Cyc-Cyc-, -G-Phe- and -G-Cyc-.

$R^4$ and $R^5$ in the compounds of formulas (III) and (IV) are each, independently of one another, preferably alkyl, alkenyl, alkoxy, aklenyloxy or alkanoyloxy having up to 8 carbon atoms. In most of these compounds, $R^4$ and $R^5$ are different from one another, one of $R^4$ and $R^5$ being in particular alkyl, alkoxy or alkenyl.

Especially preferred is the following group of dielectrically neutral compounds of formulas (V) and (VI).

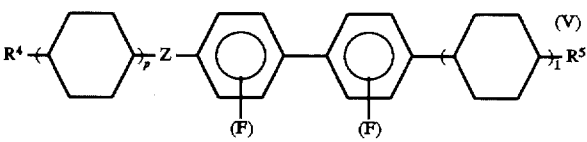

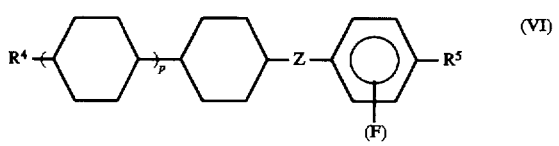

wherein

R⁴ and R⁵ are the same as described for formulas (III) and (IV),

Z is a direct bond or —CH₂CH₂—, l and p, independently from each other, are 0 or 1, and

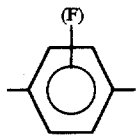

is 1,4-phenylene, 2-fluoro-1,4-phenylene, 3-fluoro-1,4-phenylene or 2,3-difluoro-1,4-phenylene.

The weight proportion of the compounds of formulas (III) to (VI) used in the liquid crystal mixtures according to the invention is preferably from 0 to 50% by weight and, in particular, from 0 to 40% by weight.

Liquid crystal compounds according to formula (II) wherein Y is H, F or Cl are defined as SFM materials while compounds with Y=CN are defined as carbonitrile compounds.

LCD's according to the present invention, which are addressed by an active matrix, preferably contain liquid crystal mixtures which are based on SFM compounds. Especially preferred are actively addressed LCD's, wherein the liquid crystal mixture contains at least 40% by weight and, most preferably, not less than 60% by weight of one or more compounds according to formula (II) wherein Y=H, F or Cl . The liquid crystal mixture of actively addressed LCD's according to the present invention preferably contains less than 20% by weight of carbonitrile compounds, especially less than 10% by weight of carbonitrile compounds and, most preferably, no carbonitrile compounds.

LCD's which are not addressed by an active matrix, but either directly time multiplexed or actively multiplex addressed, preferably contain a component of one or more carbonitrile compounds. This is especially true for STN displays which can be driven by a passive or by the so-called active multiplex addressing scheme. The percentage of the carbonitrile component with respect to the weight of the liquid crystal mixture for LCD's which are not addressed by an active matrix is preferably at least 10% by weight and specifically not less than 25% by weight. Especially preferred are liquid crystal mixtures containing at least 20% by weight of one or more compounds of formula (II) wherein Y is CN. The liquid crystal mixture of not actively addressed displays preferably contains at least 30% by weight of carbonitrile compounds and has a complex composition of at least 6 and especially at least 7 liquid crystalline compounds. In another specifically preferred embodiment, the liquid crystal mixture contains at least 15% by weight of at least one 2-ring and at least one 3-ring carbonitrile compound according to formula (II) with the ratio of the percentages of 3- and 4-ring compounds to 2-ring compounds being at least 0.18.

The liquid-crystal compounds of formula (II) and compounds of formulas (III) to (VI) are known, and are prepared by methods known per se, for example, as described in Houben-Weyl, Methoden der Organischen Chemie [Methods of Organic Chemistry], Stuttgart, Germany.

Liquid crystal mixtures used in the present invention are well-known in the prior art. Preferred LC mixtures of the types described above, are commercially available from E. Merck, Germany under the trademark Licristal®.

The present invention is illustrated in more detail by the following examples which, however, do not in any way restrict the scope of the invention.

GLOSSARY

PMDA=pyromellitic dianhydride
BPDA=3,4, 3', 4'-biphenyltetracarboxylic dianhydride
BTDA=3,4, 3', 4'-benzophenonetetracarboxylic dianhydride
6FDA=2,2-bis(3,4-dicarboxyphenyl)hexafluoropropane dianhydride
6FCDA=9,9-bis(trifluoromethyl)-2,3,6,7-xanthene-tetracarboxylic dianhydride
TFMOB=2,2'-bis(trifluoromethoxy)benzidine
DMB=2,2'-dimethylbenzidine
6FDAM=2,2-bis(4-aminophenyl)hexafluoropropane
PPD=p-phenylenediamine
DADE=4,4'-diaminodiphenyl ether
TFM-DADE=2,2'-bis(trifluoromethyl)-4,4'-diaminodiphenyl ether
TFM-MPD=5-trifluoromethyl-1,3-phenylenediamine
Rf₈MPD=5-perfluorooctyl-1,3-phenylenediamine
NMP=N-methylpyrrolidone
DMSO=dimethylsulfoxide
PAA=poly(amic acid)
PI=polyimide
ITO=indium/tin oxide ZLI-2293=a liquid crystal mixture of cyanophenyl-cyclohexanes and biphenylcyclohexanes having a clearing point of 85° C., a dielectric anisotropy of 10 (1 KHz, 20° C.) and an optical anisotropy of 0.1322 (20° C., 589 nm) (sold by E. Merck, Germany)
KHz=Kilohertz
nm=nanometer

EXAMPLE 1

Into a 100 ml reaction kettle equipped with a mechanical stirrer and nitrogen inlet and outlet were charged 4.7009 g (0.013346 mole) of TFMOB and 0.0760 g (0.0007028 mole) of PPD along with 38 ml of NMP. After dissolution of the diamines, 2.9110 g (0.013346 mole) of PMDA and 0.3120 g (0.0007023 mole) of 6FDA powders were added and rinsed in with 4 ml NMP (42 ml NMP total). The kettle was cooled with a water bath to moderate the temperature of the reaction. The reaction was stirred overnight at room temperature under nitrogen and then diluted with 20 ml of NMP. A viscous, light yellow poly(amic acid) solution resulted, a portion of which was diluted to 3.5% solids with NMP (viscosity 56 cps, film thickness 910 angstroms at 3000 RPM spin speed). The diluted PAA solution was spin coated onto ITO coated glass plates. The PAA coated glass plates were then placed on a hot plate at 100° C. for 1 minute, followed by curing in an air oven at 180°–250° C. for 1.5 hours. The cured film was then buffed twice unidirectionally with a rayon cloth (YOSHIKAWA YA20R) on a rubbing machine (KETEK, Inc.) using the following conditions: radius of rubbing wheel=50 mm, rotation speed=190 rpm, translation speed of glass plate=25 mm/second, pile impression=0.3 mm. For tilt angle measurements, the coated glass plates were assembled so that their respective rubbing directions were anti-parallel to each other. The spacing between the glass plates was set at 50 micrometers by incorporation of glass fibers into a UV curable adhesive placed around the perimeter of the plates, followed by curing of the adhesive. Two small gaps in the adhesive were left to allow filling of the cell. The liquid crystal mixture was filled into the gap between the plates via capillary action. The completed cell was placed in an oven at 120° C. for 20 minutes to allow for complete isotropization of the LC mixture. The test cells were then cooled and stored at room temperature for 12 hours prior to measurement of the tilt angle.

Tilt angle measurements were performed using the crystal rotation method as described by G. Baur et al. Physics Letters, Vol. 56A, No. 2, pp. 142–144, 1976.

The liquid crystal test cell containing the polyimide alignment layer and ZLI-2293 (E. Merck, Germany) as liquid crystal mixture exhibited an initial tilt angle of 11.4° when the polyimide was cured at 180° C. and 7.3° when the polyimide was cured at 250° C. Post heat treatment of the cells at 180° C. for 2 hours after rubbing but before filling with the liquid crystal mixture was used to simulate the cure cycle of sealing the sealant adhesive. This post heat treatment resulted in stable, high tilt angles of 6.6° for the 180° C. cured sample and 6.5° for the 250° C. cured sample.

Image sticking, which is also called image retention, is a phenomenon commonly encountered, for example, in STN displays, especially for laptop application and adversely affects their performance.

After a picture, which had been addressed for some time, is switched off, the former addressed image still remains visible. This after image, in some cases, is a negative image and often remains visible for several seconds and can even last for minutes. This effect is determined by the interaction of the liquid crystal and the alignment layer. In order to evaluate image sticking STN test cells were made having a twist angle of 240° and a cell gap of 5.9 to 6.1 μm. The test cells were filled with ZLI-5550-059, a standard STN liquid crystal mixture doped with 0.8% S-811 (both from E. Merck, Germany). The test cells were sealed and heated in an oven at 120° C. for 20 minutes to allow complete isotropization of the liquid crystal mixture. The test cell had an array of three pairs of electrodes each of ⅓ cm² area. Alternatively, three separate but identical cells each with one electrode can also be used. All three electrodes were addressed with the same intermediate voltages to check that they displayed the same gray levels. Then, the center electrode was addressed for 12 hours using a voltage 30 volts, 15 kHz, square wave, whereas the two outer electrodes were not addressed.

A voltage near the threshold voltage ($V_{10}$, for 10% relative contrast), typically between $V_{10}$ and $V_{50}$ (the latter for 50% relative contrast) was then applied to all three electrodes simultaneously. A decrease or an increase of the gray level of the center electrode, relative to the outer electrodes indicated image sticking.

In liquid crystal cells, disclinations caused by changes in direction of orientation can occur, when the orientation is not homogeneous. These are visible to the naked eye, for example, in the tilt angle test cells, as their borders are light scattering. Under crossed polarizers these borderlines are visible even for small disclinations as bright small spots on a dark background. Microscopically they appear as small closed lines. In liquid crystal displays their appearance can significantly decrease the contrast.

The tilt angle and image sticking test results are given in Table I.

EXAMPLES 2 to 14 and Comparative EXAMPLES 1C to 8C

In a similar manner to Example 1, additional poly(amic acids) were prepared based on PMDA and TFMOB and various comonomers. Table I gives the composition of the resulting polyimides, the tilt angles and the image sticking results.

TABLE I

| Example No. | Monomers (mole %) Tetracarboxylic Acid Component | | Diamine Component | |
|---|---|---|---|---|
| 1 | PMDA (95) | 6FDA (5) | TFMOB (95) | PPD (5) |
| 2 | PMDA (100) | — | TFMOB (90) | PPD (10) |
| 3 | PMDA (90) | BPDA (10) | TFMOB (95) | PPD (5) |
| 4 | PMDA (85) | 6FDA (15) | TFMOB (100) | — |
| 5 | PMDA (75) | 6FDA (25) | TFMOB (100) | — |
| 6 | PMDA (60) | 6FDA (40) | TFMOB (100) | — |
| 7 | PMDA (100) | — | TFMOB (50) | DADE (50) |
| 8 | PMDA (100) | — | TFMOB (75) | DADE (25) |
| 9 | PMDA (100) | — | TFMOB (90) | DADE (10) |
| 10 | PMDA (100) | — | TFMOB (80) | 6FDAM (20) |
| 11 | PMDA (100) | — | TFMOB (90) | 6FDAM (10) |
| 12 | PMDA (100) | — | TFMOB (95) | 6FDAM (5) |
| 13 | PMDA (80) | BTDA (20) | TFMOB (100) | — |
| 14 | PMDA (100) | — | TFMOB (95) | Rf$_6$MPD (5) |
| 15 | PMDA (100) | — | TFMOB (100) | — |
| 1C | PMDA (50) | BPDA (50) | TFMOB (100) | — |
| 2C | — | BPDA (100) | TFMOB (100) | — |
| 3C | — | BPDA (100) | TFMOB (75) | PPD (25) |
| 4C | PMDA (100) | — | — | DMB (100) |
| 5C | PMDA (100) | — | — | TFM-DADE (100) |
| 6C | PMDA (100) | — | — | TFM-MPD (100) |
| 7C | PMDA (100) | — | — | 6FDAM (100) |
| 8C | 6FCDA (75) | BPDA (25) | TFMOB (100) | — |

| Example | Cure Temp. (°C.) | Tilt Angle (initial) | Tilt Angle (after 180° C., 2 hr heat treatment) | Image Sticking |
|---|---|---|---|---|
| 1 | 180 | 11.4 | 6.6 | None |
| | 250 | 7.3 | 6.5 | None |
| 2 | 180 | 5.9 | 4.4 | None |
| | 250 | 6.8 | 5.8 | None |
| 3 | 180 | 9.5 | 5.9 | None |
| | 250 | 7.1 | 5.6 | None |
| 4 | 180 | 9.2 | 7.2 | Weak |
| | 250 | 9.6 | 8.6 | Weak |
| 5 | 180 | 2.0 | 3.0 | * |
| | 250 | 6.3 | 6.5 | Weak |
| 6 | 180 | 1.1 | 1.0 | * |
| | 250 | 5.0 | 4.9 | Weak |
| 7 | 180 | 5.0 | 4.9 | None |
| | 250 | 6.1 | 5.6 | None |
| 8 | 180 | 7.2 | 6.4 | None |
| | 250 | 7.4 | 6.5 | None |
| 9 | 180 | 10.2 | 7.0 | None |
| | 250 | 8.5 | 7.4 | None |
| 10 | 180 | 2.8 | 4.2 | None |
| | 250 | 7.7 | 7.0 | None |
| 11 | 180 | 12.4 | 10.1 | None |
| | 250 | 11.8 | 10.3 | None |
| 12 | 180 | 10.5 | 7.4 | None |
| | 250 | 9.1 | 8.4 | None |
| 13 | 180 | 5.6 | 4.0 | None |
| | 250 | 5.6 | 4.9 | None |
| 14 | 180 | 17.7 | 9.2 | Weak |
| | 250 | 11.3 | 8.0 | Weak |
| 15 | 180 | 17.7 | 8.8 | None |
| | 250 | 10.5 | 10.1 | None |
| 1C | 180 | 3.3 | 2.7 | * |
| | 250 | 2.3 | 2.3 | * |
| 2C | 180 | 0.9 | 0.7 | * |
| | 250 | 3.7 | 2.7 | * |
| 3C | 180 | 1.7 | 1.5 | * |
| | 250 | 1.9 | 1.6 | * |
| 4C | 180 | 2.5 | 2.0 | * |
| | 250 | 2.3 | 1.9 | * |
| 5C | 180 | 0.1, poor alignment | no alignment | * |
| | 250 | 0.6, disclinations | 0.6, disclinations | * |
| 6C | 180 | 1.3, disclinations | 0.4 poor alignment | * |

TABLE I-continued

| | | | | |
|---|---|---|---|---|
| 7C | 250 | no alignment | no alignment | * |
| | 180 | 0.2, disclinations | 0.1 poor aligment | * |
| | 250 | 1.2 disclinations | 0.6 disclinations | * |
| 8C | 180 | 0.1 poor alignment | 0.3 | * |
| | 250 | 2.8 | 2.5 | * |

*Not applicable due to non-uniform alignment or low tilt angle.

EXAMPLE 15

In a similar manner to Example 1, a poly(amic acid) was prepared from 12.3515 g of TFMOB and 7.6485 g of PMDA in 80 ml of NMP. Subsequently, the reaction mixture was diluted with 20 ml of NMP to a 16.7% (w/v) solution. A 103.5 g portion of this solution was further diluted with 40.5 g of DMSO. A portion of the DMSO diluted polymer solution was then further diluted with NMP to a final concentration of about 4% solids (viscosity 22 cps, film thickness 580 angstroms at 3000 RPM spin speed). Coatings and evaluation of this material as an alignment layer with ZLI-2293 (E. Merck, Germany) as liquid crystal mixture yielded an initial tilt angle of 17.7° when the polyimide was cured at 180° C. and 10.5° when the polyimide was cured at 250° C. Post heat treatment of the sealed test cells at 180° C. for 2 hours resulted in stable, high tilt angles of 8.8° for the 180° C. cured sample and 10.1° for the 250° C. cured sample. Results are given in Table I.

What is claimed is:

1. A polyimide alignment film for aligning a liquid crystal layer of a liquid crystal display device comprising an aromatic tetracarboxylic acid component containing from 60 to 100 mole %, based on the total molar amount of aromatic tetracarboxylic acid component, of pyromellitic acid or a functional derivative thereof and an aromatic diamine component containing from 40 to 100 mole %, based on the total molar amount of aromatic diamine component, of a fluorinated aromatic diamine of formula (I)

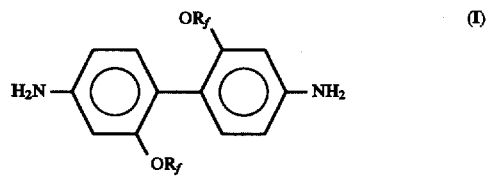

wherein $R_f$ is a linear or branched perfluorinated alkyl group containing from 1 to 4 carbon atoms and wherein said polyimide alignment film provides said liquid crystal layer with a tilt angle of from 3 to 25 degrees.

2. The polyimide alignment film of claim 1 wherein the aromatic tetracarboxylic acid component comprises from 75 to 100 mole %, based on the total molar amount of aromatic tetracarboxylic acid component, of pyromellitic acid or functional derivative thereof and wherein the aromatic diamine component comprises from 75 to 100 mole %, based on the total molar amount of aromatic diamine component, of said fluorinated aromatic diamine (I).

3. The polyimide alignment film of claims 1 or 2 wherein the pyromellitic acid or functional derivative thereof comprises pyromellitic dianhydride and wherein said fluorinated aromatic diamine (I) comprises 2,2'-bis(trifluoromethoxy) benzidine.

4. The polyimide alignment film of claim 1 wherein the aromatic tetracarboxylic acid component contains, in addition to the pyromellitic acid or functional derivative thereof, not more than 40 mole % of at least one additional tetracarboxylic acid ingredient; and wherein the aromatic diamine component contains, in addition to the fluorinated aromatic diamine (I), not more than 60 mole % of at least one additional diamine ingredient.

5. The polyimide alignment film of claim 4 wherein the additional tetracarboxylic acid ingredient is selected from the group consisting of 3,3',4,4'-biphenyltetracarboxylic acid, 2,3,3',4'-biphenyltetracarboxylic acid, 2,2',3,3'-biphenyltetracarboxylic acid, 3,3',4,4'-benzophenone-tetracarboxylic acid, 2,2-bis-(3,4-dicarboxyphenyl)-hexafluoropropane, 2,2-bis(3,4-dicarboxyphenyl)propane, 1,4,5,8-naphthalenetetracarboxylic acid, 2,3,6,7-naphthalenetetracarboxylic acid, 1,2,5,6-naphthalene-tetracarboxylic acid, bis(3,4-dicarboxyphenyl)sulfone, 1,4-bis(3,4-dicarboxyphenyl) benzene, 1,3-bis(3,4-dicarboxyphenyl)benzene, 9,9-bis(trifluoromethyl)-2,3,6,7-xanthenetetracarboxylic acid, 9-phenyl-9-trifluoromethyl-2,3,6,7-xanthenetetracarboxylic acid, cyclobutanetetracarboxylic acid, 2,3,5-tricarboxycyclopentyl acetic acid, bis(3,4-dicarboxyphenyl)-methane, bis(3,4-dicarboxyphenyl) ether and their acid anhydrides and esters.

6. The polyimide alignment film of claim 4 wherein the additional diamine ingredient is selected from the group consisting of p-phenylene diamine, 4,4'-diaminodiphenyl-ether, 2,2-bis(4-aminophenyl)hexafluoropropane, 2,2-bis[4-(4-aminophenoxy)phenyl]hexafluoropropane and 5-perfluorooctyl-1,3-phenylene diamine.

7. The polyimde alginment film of claim 4 wherein the aromatic tetracarboxylic acid component comprises 100 mole % of pyromellitic dianhyride and the aromatic diamine component comprises from 50 to 90 mole % of 2,2'-bis (trifluoromethoxy) benzidine and from 10 to 50 mole % of 4,4'-diaminodiphenyl ether.

8. The polyimide alignment film of claim 4 wherein the aromatic tetracarboxylic acid component comprises 100 mole % of pyromellitic dianhyride and the diamine component comprises from 80 to 95 mole % of 2,2'-bis (trifluoromethoxy)benzidine and from 5 to 20 mole % of 2,2-bis(4-aminophenyl)hexafluoropropane.

9. A liquid crystal display device comprising:
(a) a liquid crystal layer having opposite sides;
(b) a set of electrodes on either side of said liquid crystal layer; and
(c) a polyimide alignment film layer, between each set of electrodes and said liquid crystal layer, comprising an aromatic tetracarboxylic acid component containing from 60 to 100 mole %, based on the total molar amount of aromatic tetracarboxylic acid component, of pyromellitic acid or a functional derivative thereof and an aromatic diamine component containing from 40 to 100 mole %, based on the total molar amount of aromatic diamine component, of a fluorinated aromatic diamine of formula (I)

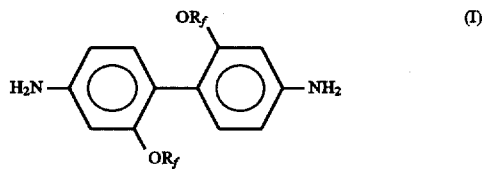

wherein $R_f$ is a linear or branched perfluorinated alkyl group containing from 1 to 4 carbon atoms and wherein said polyimide alignment film provides said liquid crystal layer with a tilt angle of from 3 to 25 degrees.

10. The liquid crystal display device of claim 9 wherein the liquid crystal layer comprises a mixture of at least one compound of the formula

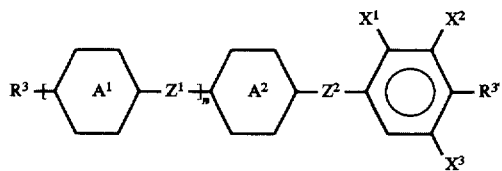

wherein $R^3$ is an alkyl group containing from 1 to 12 carbon atoms wherein, in addition, one or two non-adjacent —CH$_2$— groups can be replaced by —O—, —CO—, —COO, —OCO— or —CH=CH—;

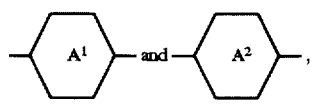

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

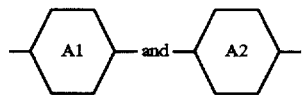

is alternatively pyrimidine-2,5-diyl, pyridine-2,5-diyl or trans-1,4-dioxane-2,5-diyl;

$Z_1$ and $Z_2$, independently of one another, are a direct bond, —CH$_2$CH$_2$—, —COO—, —OCO—, —CH=CH— or —C≡C—;

$X^1$, $X^2$ and $X^3$, independently of one another, are H or F;

$R^{3'}$ is the same as $R^3$ or is Q-Y;

Q is —CF$_2$—, —OCF$_2$—C$_2$F$_4$— or a direct bond;

Y is H, F, Cl or CN; and n is 0, 1 or 2.

* * * * *